US 6,941,359 B1

(12) United States Patent
Beaudoin et al.

(10) Patent No.: US 6,941,359 B1
(45) Date of Patent: Sep. 6, 2005

(54) METHOD AND SYSTEM FOR VISUALLY REPRESENTING NETWORK CONFIGURATIONS

(75) Inventors: Luc Beaudoin, Gatineau (CA); Blair Moxon, Kanata (CA); Suzanne L Rochford, Hull (CA)

(73) Assignee: Nortel Networks Limited, St. Laurent (CA)

( * ) Notice: Subject to any disclaimer, the term of this patent is extended or adjusted under 35 U.S.C. 154(b) by 863 days.

(21) Appl. No.: 09/782,082

(22) Filed: Feb. 14, 2001

(51) Int. Cl.[7] .......................................... G06F 15/177
(52) U.S. Cl. ..................... 709/221; 709/223; 715/733; 715/734; 715/735; 715/736; 715/737; 715/738; 715/739
(58) Field of Search ............................... 709/221, 223; 345/733, 734, 735, 736, 737, 738, 739; 715/733–739

(56) References Cited

U.S. PATENT DOCUMENTS

| | | | | |
|---|---|---|---|---|
| 5,276,789 A | * | 1/1994 | Besaw et al. ................ | 345/440 |
| 5,452,468 A | * | 9/1995 | Peterson ...................... | 345/419 |
| 5,872,932 A | * | 2/1999 | Schettler et al. ............ | 709/226 |
| 6,175,950 B1 | | 1/2001 | Scepanovic et al. | |
| 6,175,953 B1 | | 1/2001 | Scepanovic et al. | |
| 6,175,957 B1 | | 1/2001 | Ju et al. | |
| 6,225,999 B1 | * | 5/2001 | Jain et al. ................... | 345/734 |
| 6,633,312 B1 | * | 10/2003 | Rochford et al. ........... | 345/736 |
| 6,636,239 B1 | * | 10/2003 | Arquie et al. ................ | 345/736 |
| 6,744,446 B1 | * | 6/2004 | Bass et al. .................. | 345/734 |

* cited by examiner

Primary Examiner—Jeffrey Gaffin
Assistant Examiner—Niketa Patel

(57) ABSTRACT

A visualization method for a hub network configuration allows exploration of a chosen network by way of a graphical display interface (GUI), wherein multiple distinct network segments such as lines or rings are shown attached to a common node or centralized hub. The technique combines a graphical view of the segments controlled by a segment selector. The selector is coupled to a series of display indicators and a list of the attached rings contained in the network. The list can contain descriptive elements of the segments, or can provide links to such detail. A mutually exclusive selection of the attached segments is enabled using either the selector or the list of attached segments. For each segment selected, the display indicators can show the currently displayed segments on the GUI, help to highlight on the GUI a selected attached segment and provide an indication of attached segments that are related in function to the selected segment. Selected and remaining segments of the network are displayed in various shadings or colours, which enables a Network Manager or other user of the system and method to easily distinguish and consider these aspects alternatively. In the graphical view, attached segments can be displayed in stacked, overlaid, or isolated formats. The segments can consist of rings, lines, stars, bars, and chains.

28 Claims, 11 Drawing Sheets

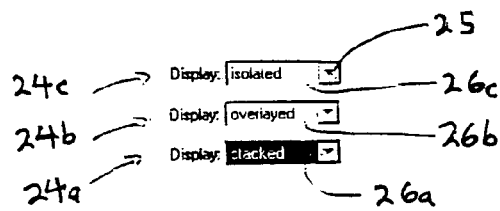
Figure 3
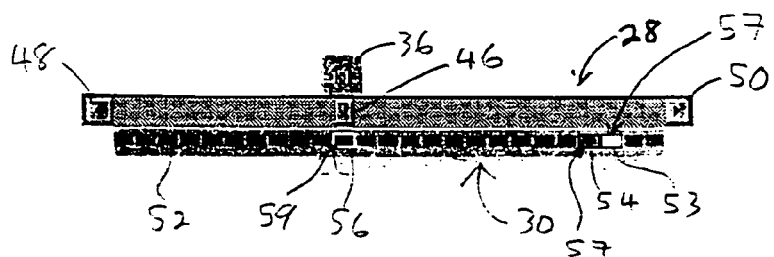
Figure 4
Figure 5

| Display mode | Hub member selection status | Hub member display 18 | | | | Display indicator 56,57 52 | |
|---|---|---|---|---|---|---|---|
| | | Visible | shade | transparency | layer | border | body |
| Stacked 26a | Target member (selected by default) 19 | yes | normal | no | top | Light grey | Dark grey |
| | Target member (selected by default) 19 permanently displayed | yes | normal | no | top | Light grey | Light grey |
| | Associated member 21 not selected | yes | normal | no | middle | black | Dark grey |
| | Associated member 21 selected (permanently displayed) | yes | normal | yes | middle | black | Light grey |
| | Other member 24 not selected | yes | normal | no | bottom | none | Dark grey |
| | Other member 24 selected (permanently displayed) | yes | normal | yes | middle | none | Light grey |
| Overlaid 26b | Target member (selected by default) 19 | yes | normal | no | top | Light grey | Dark grey |
| | Target member (selected by default) 19 permanently displayed | yes | normal | no | top | Light grey | Light grey |
| | Associated member 21 not selected | yes | Light | yes | bottom | black | Dark grey |
| | Associated member 21 selected (permanently displayed) | yes | normal | yes | middle | black | Light grey |
| | Other member 24 not selected | yes | Light | yes | bottom | none | Dark grey |
| | Other member 24 selected (permanently displayed) | yes | normal | yes | middle | none | Light grey |
| Isolated 26c | Target member (selected by default) 19 | yes | normal | no | top | Light grey | Dark grey |
| | Target member (selected by default) 19 permanently displayed | yes | normal | no | top | Light grey | Light grey |
| | Associated member 21 not selected | no | - | - | - | black | Dark grey |
| | Associated member 21 selected (permanently displayed) | yes | normal | yes | middle | black | Light grey |
| | Other member 24 not selected | no | - | - | - | none | Dark grey |
| | Other member 24 selected (permanently displayed) | yes | normal | yes | middle | none | Light grey |

Fig. 13

METHOD AND SYSTEM FOR VISUALLY REPRESENTING NETWORK CONFIGURATIONS

BACKGROUND OF THE INVENTION

Global networks are common to all of today's communication systems, wherein various electronic, optical, and wireless devices can be interconnected by a series of individual local networks to facilitate the transmission of data traffic. This traffic can include voice, video, data, and other information over a variety of transmission mediums, such as wireless, copper, and fibre optic lines. Hub network configurations are being used in network components such as optical cross connects, IP hubs and large routers, and in terabit and gigabit routers. Today's optical cross-connect network elements (such as the Nortel Networks DX or HDX) can support numerous topologies, including network segments such as rings, stars, chains, bus, and associated nodes and links. For example, the DX allows connections of up to 40 rings attached to a single optical node. As new technology is developed the complexity of network configurations is expected to increase, where the complexity of the hub network configuration can be a function of the number of attached segments and the number of network elements per attached segment.

The usefulness of hub network management applications can depend on an adequate representation of the increasing number of connections to support management tasks, such as configuration, route and path analysis, line or node failure detection, and other associated problem solving activities. Another issue in networks is hub network layout, which is an intensive and extensive process wherein each network item is carefully mapped to facilitate differentiable and selectable item representations. Therefore, it is important for Network Managers to be able to differentiate the various attached network segments and to select them in a systematic fashion to efficiently explore a representation of the hub network. Current versions of hub network management applications or tools are Graphical User Interfaces (GUIs) based on single or multiple views of the associated segments and nodes, which are connected to the central hub of a selected network. Unfortunately, these applications are not adapted to facilitate the Network Managers or other users to efficiently layout, represent, or manage the dense hub network configurations.

The single view technique allows the total number of attached network segments to be simultaneously represented on a single display to the Network Manager, such as the GUI on a video screen or computer monitor. However, experience has shown that this single view is only practical in maintaining the hub network with a limited number of segments and associated nodes, such as two to four rings depending upon the complexity of each attached ring. The network configurations can also be composed of various typology types such as linear chains, stars, and bus. The single view display can be difficult to interpret by the Network Manager as more connections are represented in the network, since representations of dense complex hub network configurations can create a mesh of lines crossing in all directions. This can cause problems in distinguishing between specific adjacent attached network segments, in identifying the common node, and in selecting specific network items contained in the display. Consequently, the topology and connection logic may get lost in a graphical chaos, which can increase the amount of time the Network Manager must spend in analyzing the network. Furthermore, the nodes and associated link alarms can be overlaid or hidden from view, which can make the visual clutter more acute. As well, any associated text lists used to supervise the network can become too long to be displayed in a comprehensive manner on the GUI.

Multiple view network management software was developed to address the problems inherent with the single view technique and thereby to provide a more user-friendly network management tool. This multiple view technique represents hub network configurations through multiple associated views. These view can be displayed simultaneously in distinct windows, where the content of a single window can be refreshed to represent the views on a one by one basis. A first view of the technique presents a start network segment with a special off-page connector attached to the common node for each attached segment to the central hub. The off-page connectors indicate to the Network Manager how each segment connects to other segments in separate windows of the display. From each off-page connector, the Network Manager can call a separate view where the connected attached segment will be displayed. The Network Manager can then view descriptive elements of each of the attached segments on the separate views, in order to manage the hub network configuration.

A problem with the multiple view technique is that it can become difficult to use as the network reaches a count of more than four attached segments, for example, since it can be difficult to represent more than four off-page connectors attached to the central hub on a single display. The network manager views the various hub network segments by calling the presentation in distinct views using the off-page connectors. The views can be presented in the same window or in distinct windows. Each view presents a target hub segment and the off-page connectors leading to other hub sections, all attached to the central hub node. Using this technique, the network manager can experience difficulties in maintaining continuity between each of the off-page connectors and the associated hub members, as they become more numerous, since the Network Manger depends on memory to maintain the interrelationships between the various views. Furthermore, in each view, the central hub and the attached off-page connectors can be displayed in various positions and orientations. This may cause extra difficulty and confusion for the Network Manager in examining data for the attached hub segments. Moreover, as the number of hub segments increases, the number of associated off-page connectors can become such that the representation causes visual concentration and overlapping, thereby making the representation difficult to distinguish and to select specific segments therefrom.

When exploring the representation of the hub network configurations, it is desirable to differentiate the various attached segments and select them in a systematic way to consider them in isolation or to compare them selectively. Both of the above discussed techniques (single view and multiple view) can represent hub network configurations. However, when the number of attached segments increases (typically past four segments) the representation of the network quickly gets cluttered and visual elements tend to concentrate around the central node and to overlap, making it difficult for the Network Manager to understand the representations and to select individual components. Consequently, problems in selecting and displaying specific network segments by the above discussed techniques can reduce Network Manager efficiency in network layout and management.

It is an object of the present invention to provide a system and method for representing centralized network configurations in order to obviate or mitigate some of the above-mentioned disadvantages.

SUMMARY OF THE INVENTION

The present invention is directed to a method and network management tool for representing a network configuration including a plurality of distinct network segments and associated nodes attached to a centralized node. A user interface can be used for displaying the representation of the network configuration to help a user to systematically navigate the distinct network segments and associated nodes in the network. A list and a display controller are used for affecting a display content of the representation on the user interface. The list contains a plurality of attributes associated with segments and nodes. The display controller helps the user to maintain a d reference frame to refer to while navigating the network representation shown on the user interface, thereby maintaining selected segments in context of the whole network configuration. By using such reference frame, the display controller can help the user to coordinate the display of the distinct network rings and other associated network components in a predefined sequence on the user interface. The system tool can be used to select and display specific network segments to help increase Network Manager efficiency in network layout and maintenance.

According to one embodiment of the present invention there is provided a network management tool for representing a network configuration including a plurality of distinct network segments coupled to a centralized node. The tool comprises a user interface for displaying the representation of the network configuration. The system tool also comprises a list containing a plurality of attributes of the segments; and a display controller for affecting a display content of the representation on the user interface. The display controller provides a reference frame for maintaining the location of selected segments in context of the display content, wherein the display controller coordinates the display of the display content in a predetermined sequence on the user interface.

According to a further embodiment of the present invention there is provided a computer program product for representing a network configuration including a plurality of distinct network segments coupled to a centralized node. The product comprises a computer-readable medium and a display module stored on the computer-readable medium for displaying the representation of the network configuration. The product also comprises a list module coupled to the display module for displaying a plurality of attributes of the segments and a display controller module coupled to the display module for affecting an output display content of the representation generated by the display module. The display controller module provides a reference frame for maintaining the location of selected segments in context of the display content, wherein the display controller module coordinates the display of the display content in a predetermined sequence to assist the user in navigation of the distinct network segments and other network components.

BRIEF DESCRIPTION OF THE DRAWINGS

These and other features of the preferred embodiments of the invention will become more apparent in the following detailed description, in which reference is made to the appended drawings by way of example only, wherein:

FIG. 3 is a diagram of display types of FIG. 2;

FIG. 4 is a description list of FIG. 2;

FIG. 5 is a controller of FIG. 2;

FIG. 13 is a table of colour schemes for the tool of FIG. 2.

DESCRIPTION OF THE PREFERRED EMBODIMENTS

Figure 1:
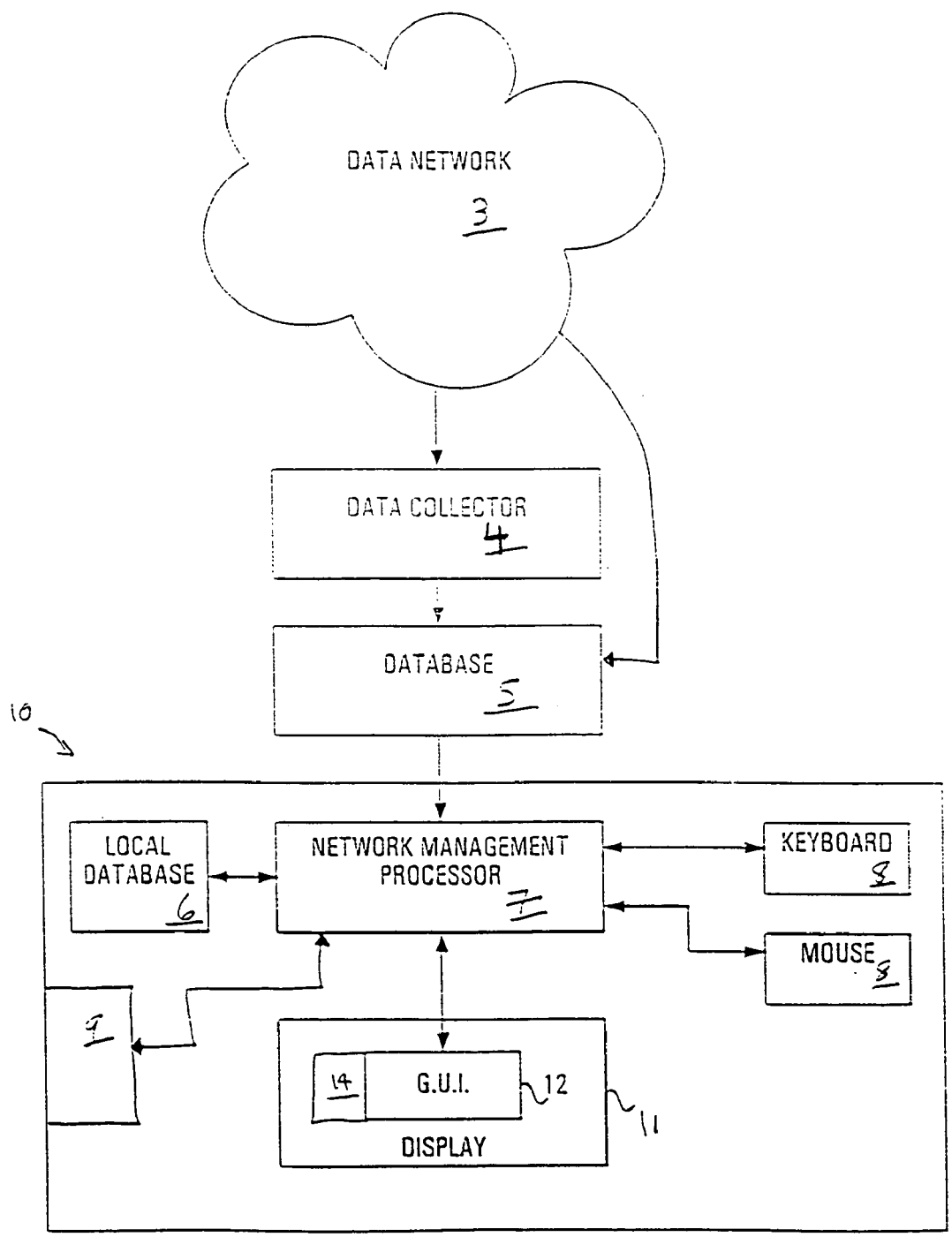
FIG. 1 is a block diagram of a data network coupled to a network configuration tool.

Referring to FIG. 1, a network configuration tool 10 is coupled in series with a global database 5, a data collector 4, and one or more data networks 3, such as a SONET network. The data network 3 can be a network of interconnected communication devices permitting communication of data from one point in the network 3 to another. Some examples of networks 3 include Synchronous Optical Networks (SONET), Synchronous Digital Hierarchy (SDH), Dense Wave Division Multiplexing (DWDM), a Synchronous Transfer Mode (ATM) Networks, the Internet, Networks of Microwave and Antenna Base Stations, Satellite Networks, and Networks comprising a mixture of these technologies. Regardless of the specific type, the networks 3 comprise a number of network entities or segments that each have a set of defined network features. For example, an ATM Network includes network nodes and interconnections or links that may be used for a particular customer and/or service. In other networks 3, the network entities may include such things as routers, antenna base stations, or interconnected segments that range from copper wire to fiber optic cable to microwave links to be represented by the network configuration tool 10.

The data collector 4 associated with the network configuration tool 10 is preferably capable of collecting status and performance information concerning network entities contained within the data networks 3, through a series of status and performance signals being sent from the network entities to the data collector 4. The possible status signals in one example can include a warning flag, a failure notice, another alarm indication, and an "OK" flag. The possible performance signals in one example include signals comprising a particular network entities error rate and percent utilization. The status and performance signals preferably are stored in the global database 5 as status and performance attributes respectively of the network entities or segments.

The database 5 preferably receives and stores the status and performance information from the data collector 4 and further receives and stores configuration and layout information concerning the network entities within the network 3. The configuration information preferably includes all connections between the network entities within the network 3, such as a particular node 20 with a particular network interconnection 22 (see FIG. 2). The entry of this configuration information to the database 5 could be made by a central operator at the database 5 or alternatively could be communicated through the data network 3 and the data collector 4 by operators at remote locations, such as customer sites. Alternatively, this information may be entered into the database 5 by having network entities contained in the network 3 directly communicate with the database 5. Preferably, this information represents a substantially real time status of elements contained within the network 3, however historical information could also be stored if desired.

The network configuration tool 10 computer system preferably comprises a network management processor 7 coupled to the global database 5. The processor 7 is also coupled to a display 11 and to user input devices 8, such as a keyboard, a mouse, or other suitable devices. If the display 11 is touch sensitive, then the display itself can be the user input device 8. A computer readable storage medium 9 is coupled to the processor 7 for providing instructions to the processor 7 to perform steps or algorithms related to operation of the network configuration tool 10. The computer readable medium 9 can include hardware and/or software such as, by way of example only, magnetic disks, magnetic tape, optically readable media such as CD ROMs, and semiconductor memory such as PCMCIA cards. In each case, the medium 9 may take the form of a portable item such as a small disk, floppy diskette, cassette, or it may take the form of a relatively largely or immobile item such as a hard disk drive, solid state memory card, or RAM provided in the computer system of the tool 10. It should be noted that the above listed example medium 9 can be used either alone or in combination.

The configuration network tool 10 computer system can include a local database 6, coupled to the Network Manager processor 7, to receive and store categorization information corresponding to the network entities within the network 3 of interest, i.e. a user selected subset or snapshot of information contained in the global database 5. This categorization information preferably consists of a direct containment hierarchy of the network segments and corresponding attributes for each of the network regions of interest, and an identification of where in each containment hierarchy each network entity is located. In some embodiments, a network entity could be located in more than one location with the containment hierarchy, for example, if a network entity is shared between two different customers.

The categorization information can be manually input to the local database 6 by operators using input devices 8, or can be downloaded in either "on" or "off" line modes from the global database 5. For instance, this categorization can be communicated to the local database 6 by operators at remote locations such as customer sites connected to the data network 3. In the end, the local database 6 preferably maintains a file folder structure (see FIG. 12) for each of the attribute layer containment hierarchies with a particular network entity being included in one or more folders. Alternative, the local database 6 could maintain a list of the network entities within the network 3 of interest along with a list corresponding network features or attributes that are associated with the network entities.

The network configuration tool 10 can be adapted to perform two functions. Firstly, it presents a GUI 12 on the display 11 to enable the presentation of a representation of network segments and attributes to a user in a coherent manner and to enable the receipt of instructions from the user through the user input device 8. Secondly, the network configuration tool 10 coordinates the transfer of data stored in the global database 6 to the tool 10 and performs processing on data stored in the local database 6 in accordance with the instructions received from the user through the devices 8 and the computer readable medium 9, in order to put the network data into a form suitable for the display on the display 11.

Figure 2:
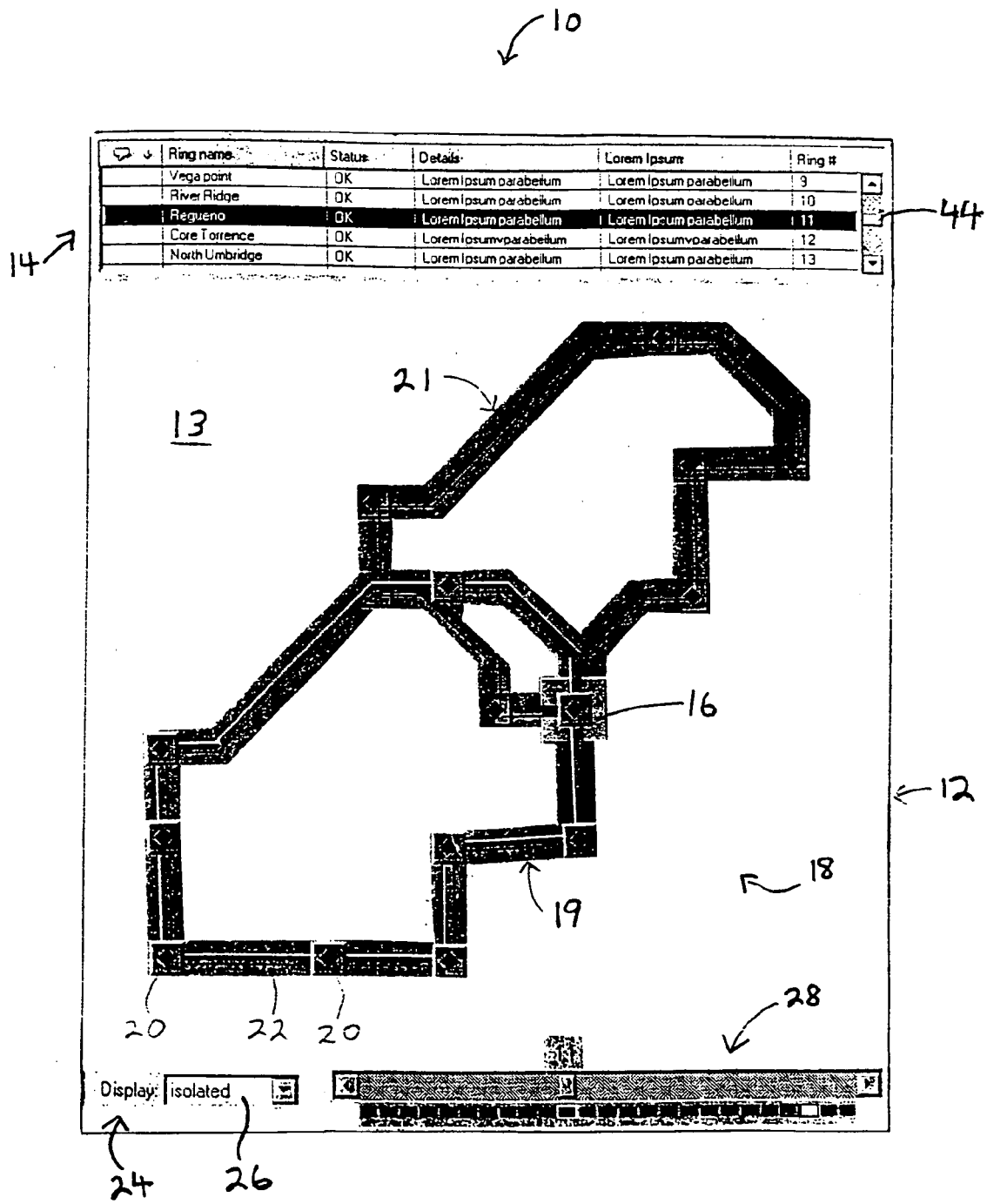
FIG. 2 is a diagram of the network configuration tool of FIG. 1.

Referring to FIG. 2, the network configuration tool 10 consists of the Graphical User Interface (GUI) 12 and a list 14 on the display 11, which contains a description of attributes of member elements contained in a hub network display 18. The hub network display 18 is presented on a background 13 of the GUI 12, and can be used to portray a visual representation of a selected hub network configuration. The hub network display 18 of FIG. 2 contains two segments or rings 19, 21 that are interconnected by a central hub 16. The central hub 16 is a central point or region that connects multiple segments to one another, such as but not limited to "one to many" or "fan outs", where one line is multiplexed to many lines through the central hub 16. The hub 16 can be defined as or distribution point in the network, or as a device that accepts a signal from one network location and redistributes it to one or more adjacent network locations. The GUI 12 displays hub 16 connecting the ring 19 on top of the other ring 21, whereby portions of the ring 21 are obscured. The fact that ring 19 is the top ring in the display 18 can also be indicated by making ring 19 either lighter or darker in shading than ring 21 on the GUI 12.

It should be noted that the display 18 is presented as a virtual spiral, wherein the attached individual rings 19, 21 are displayed in an orderly fashion radiating from a central region of the spiral represented by the central hub 16. In general, the spiral width can increase with each revolution it makes around the centre hub 16, wherein past a certain number of revolutions the spiral may be easily represented in any fixed size media. The present display 18 is preferably similar to that of a cork screw where each rotation around centre 16 defines a layer in depth without increasing the width of the display 18. Each ring 19, 21 contained in the display 18 consists of a series of nodes 20, which are interconnected by links 22. A scroll bar 28, shown horizontally, and the list 14 can be used as a display controller to help control the number and display mode 26 format of the rings 19, 21 given to the Network Manager on the GUI 12. The Network Manager can employ various features of the bar 28 and list 14 to dynamically navigate and provide information on the rings 19, 21 contained in the display 18, as further explained below. Also located on the GUI 12 is a drop down menu bar 24, which indicates the display format 26 for the display 18.

Figure 6:
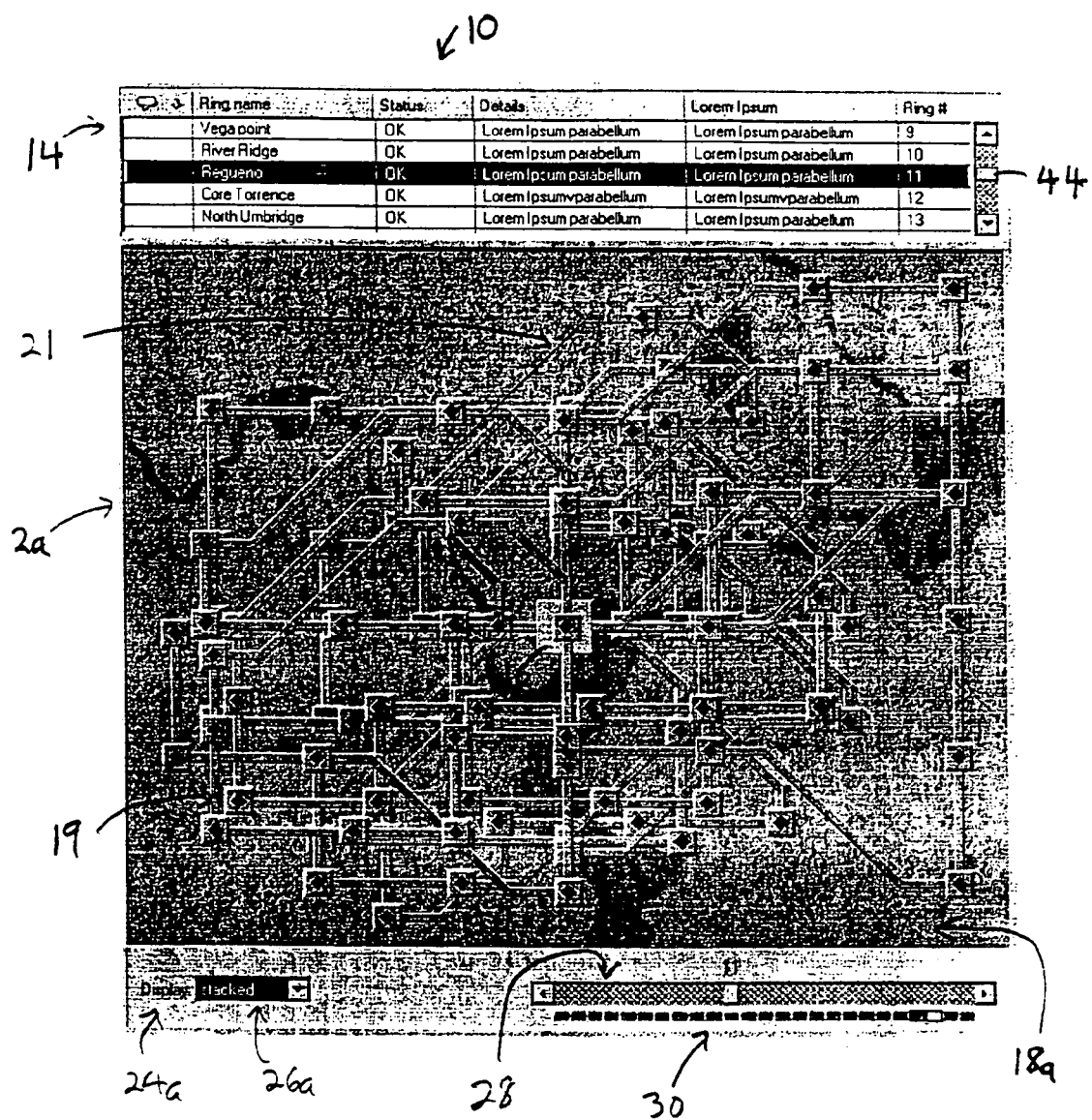
FIG. 6 is a diagram showing a stacked display type of the tool of FIG. 2.
Figure 7:
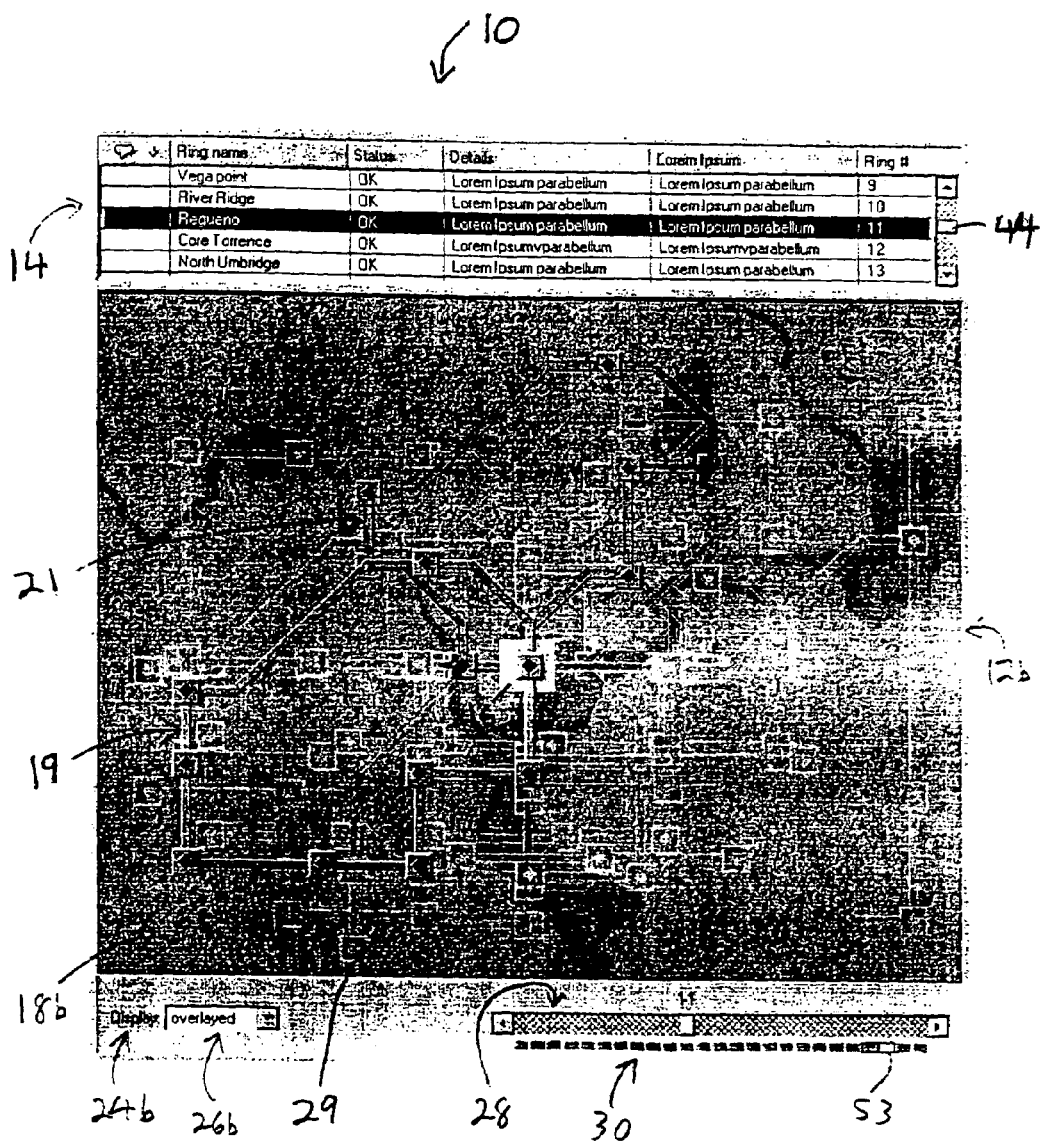
FIG. 7 is a diagram showing an overlaid display type of FIG. 2.

The Network Manager can change the presentation of the display 18 on the GUI 12 by using the drop down menu bar 24, which has three selectable displays as explained below, or other GUI selection mechanisms as is known in the art. It is recognized that the display 18 can contain more than two attached rings 19, 21 shown, in order to represent denser hub network configurations, as shown in FIGS. 6 and 7. The density of network configuration can be related to the number of network segments connected to the hub 16 and/or the complexity of each segment and number of associated nodes.

Referring to FIG. 3, versions of the drop down menu bar 24a,b,c consist of three different types of display format 26a,b,c for the display 18, namely stacked, overlaid, and isolated respectively. Each of the formats 26a,b,c can be chosen by using a drop down arrow 25 and then selecting the display format 26a,b,c as desired. A stacked display GUI 12a (see FIG. 6) presents a display 18a showing all individual rings contained in an example total hub network configuration and connected to the central hub 16. An overlaid display GUI 12b (see FIG. 7) shows the target ring 19 and associated ring 21 chosen as a subset selected from the display 18a, where the remaining rings 29 are shown in ghosted view. An isolated display GUI 12c (see FIG. 8) shows a display 18c containing the associated ring 21 isolated from the total display 18a, whereby the remaining rings 29 and the target ring 19 are absent. It is recognized that more than three display formats can be used, if desired such as but not limited to "target" showing only the target ring 19, "associated and alarmed" showing only the associated ring 21 and corresponding alarm status rungs, and "target and alarmed" showing only the target ring 19 and corresponding alarm status rings.

The colour, various lighter shadings, and transparent presentation formats of the target 19, associated 21, and remaining 29 segments respectively (and corresponding nodes 20 and links 22) are used by the GUI 12 to help the Network Manager identify or distinguish particular portions of the display 18, as desired. A colour coding of the elements on the display 18 can be such as but not limited to: red, orange, and cyan yellow for various alarm states; green for IP links 22 and nodes 20; mauve for optical or SONET links 22 and nodes 20; yellowish green for switch devices; and brown for wireless links 22 and nodes 20. The target ring 19 or segment is preferably represented as a solid colour, the associated segments 21 are preferably represented as a lighter shade of the solid colour, and the remaining rings 29 are preferably represented as the lighter shade but in a substantially transparent or ghosted format. It is recognized that other colour coding schemes and/or line types can be used to represent the various elements on the display 18.

Referring to FIG. 4, the list 14 contains descriptions of the total number of network segments, or in this case rings, contained in the hub network configuration in several columns 34, with headings 27, 29, 31, 33, 35, and 37 respectively. The details contained in the list 14 can help the Network Manager when using the tool 10 to survey ring content, ring status, and to obtain information required for maintaining the hub network configuration of the rings associated with the selected central hub 16. These details can be stored in the local database 6 in either a real or historical time format. The list 14 is composed of entry rows 41 for each hub network segment with a number of attributes for each segment contained in the columns 34. The rows 41 can be sorted based on one or many attributes by selecting of any of the column 34 headings in row 39. This selection will cause the contents of that particular column, identified by rows 41, to be sorted in a predefined manner such as in an ascending or descending order. For example, column 29 refers to the geographical name of each network ring, which can be sorted in alphabetical order. It is also recognized that the left to right ordering of the columns 3 can be customizable to user preferences.

Column 31 shows a "last reported" or "polled" status of each ring, such as in either "OK" or "FAIL" mode, which can be sorted by a selected mode. Columns 33 and 35 can be used to provide information such as the number of nodes or type of nodes contained in each ring listed. Column 37 contains unique Ring #s, such as one, two, three, etc. . . . , that are distinct from one another in the list 14, which can be sorted by numerical order. This index number assigns one Ring # of the list 14 to each ring or segment that is attached to the central hub 16 and contained in the total network hub configuration under consideration by the Network Manager. It is recognized that Ring #s other that the Arabic numerals shown can be used to uniquely identify the network segments contained in the hub network display 18, if desired.

Column 27 of the list 14 can be used to provide a cross indexed list of ring attributes containing both status and geographical information for example, which could be used in the case where there are an abundance of rings having a "FAIL" status, such as thirteen rings. In this case, the example list 14 shown in FIG. 4 is not long enough to represent all thirteen "FAIL" rings at a glance to the Network Manager when using the tool 10. Therefore, the Network Manager could sort the "FAIL" rings using column 27 on the basis of geographical location to further narrow the "FAIL" list for initial investigation. This sort function would result in a reordering of the rows 41 of the list 14, which is affected by the chosen sorting format of the columns 34. It is recognized that other cross-index criteria could be given in column 27, if desired.

The list 14 also contains a scroll bar 38, shown in a vertical position, which allows the descriptions of rings contained in the network 3 to be manually chosen by selecting an up arrow 40 or a down arrow 42. A target row 32 within the list 14, identified for example from the other rows 41 by being displayed in reverse mode, can be used to indicate which of the rings contained in the network 3 will be sorted or targeted to the top of the display 18 shown on the GUI 12. For example referring to FIG. 2, target row 32 shows that Ring # "11" has been targeted, thereby overlaying the target ring 19 on top of the other rings 21 in the display 18. It should be noted that scrolling of the list 14 contents does not have to result in the movement of a thumb 46, shown in FIG. 5. Once the Network Manager has scrolled the list 14 to the desired location, one of the rows 41 is targeted by the user from those displayed by the tool 10 (indicated by 32 in FIG. 4), which can cause the reverse mode display of the selected row 32 for portraying the targeting in this case of "Ring # 11". It should be noted that the target ring 19 of the display 18 is identified in the list 14 with the index Ring #s of column 37. Furthermore, the selection of the target row 32 results in simultaneous placement of the thumb 46 in the scroll bar 28, as discussed below.

Referring to FIG. 5, the contents of the display 18 are also controlled by a reference system having the scroll bar 28, which is coupled together with an indicator bar 30. The reference system is used to maintain location of particular segments of the display 18 in context with all other segments, either displayed or not displayed. The scroll bar 28 consists of a thumb 46 as well as two buttons at each end of the bar 28, identified as a left arrow 48 and a right arrow 50 icons respectively. The thumb 46 can be moved along the scroll bar 28 by discrete increments pertaining to the width of the display indicator 52 contained in the indicator bar 30. The position of the thumb 46 on the scroll bar 28 indicates the currently selected target segment (in this case target ring 19) inside of the display 18. The position of the thumb 46 can be controlled by the Network Manager either by direct manipulation of the thumb using the mouse 8 to slide it to the left or right, or by using the control buttons 48, 50 to displace the thumb 46 in a step wise manner. The selection of the thumb 46 position along the scroll bar 28 targets distinct hub segments and triggers the targeted segments (in this case target ring 19) to be displayed on the network display 18, which is indicated by the position of the thumb 46 over a representative one of the indicators 52.

The associated indicator bar 30 consists of several display indicators 52 placed adjacent to one another horizontally along the length of the bar 30. The total number of indicators 52 displayed in bar 30 corresponds to the total number of hub segments contained in column 37 of list 14. Furthermore, the indicators 52 remain in a preferably fixed order along the bar 30 to provide a common reference frame in a global context, otherwise known as to maintain location in context, for the rings contained in the selected hub network 3, irregardless of the sorted ring order presented by column 37 in list 14. It is recognized that the indicators 52, if desired, can portray other predetermined subsets of the rings contained in the network 3.

The display indicators 52 are coupled in presentation with the position of the thumb 46 in the scroll bar 28. These graphical attributes of the display indicators (see FIG. 13 for details) describe the display status of associated hub members on the display 18. For example, the display indicator 52 corresponding to the target ring 19 is indicated using a light grey border and a dark grey body. For each target ring 19 selected, a number of associated hub segments can be indicated using display indicators 52 with a black border and a dark grey body, if not selected, or light grey if selected. The remaining hub segments can be indicated using no border and either a light or dark grey body, indicating selection or non-selection respectively.

Figure 11:
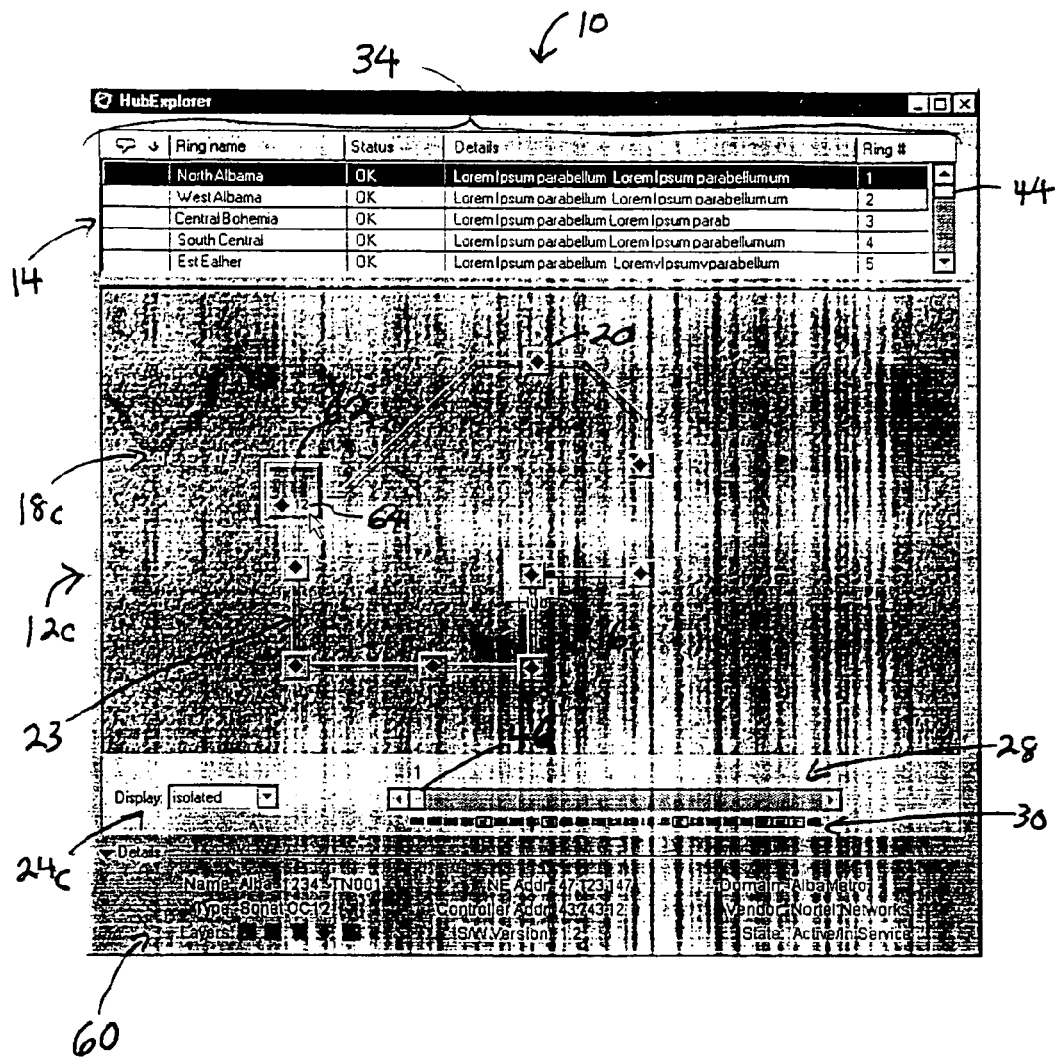
FIG. 11 is a further embodiment of the tool of FIG. 2.

The reference system also has a ring number indicator 36 is placed above the thumb 46, thereby indicating on the bar 30 that ring "11" is shown on top of all other rings displayed in the display 18 on the GUI 12, as discussed above. The value of the number indicator 36 corresponds to the "Ring #" of the target row 32. When the thumb 46 is placed over the rightmost indicator 52, the number indicator 36 would display the number "1", as shown in FIG. 11. As the thumb 46 is moved along the scroll bar 28, the indicator 36 changes its value in a systematic fashion, which may not always correspond to the order of the Ring # shown in column 37 of list 14. It should be noted that the value "11" of the indicator 36 shown in FIG. 5 corresponds to the "Ring # 11" shown in row 32 of column 37 in FIG. 4. However, it is preferable that the placement order of the indicators 52 remains fixed on the bar 30. It should be noted that movement of the thumb 46 in the horizontal scroll bar 28 does not cause a change the list 14 scroll position as displayed prior to the thumb 46 movement. This arrangement provides that the list 14 contents do not change on the GUI 12, as the thumb 46 is positioned along the scroll bar 28, thereby facilitating the retention of context of the list 14 contents to the Network Manager during selection of the thumb 46 position. When the Network Manager moves the thumb 46, its position corresponds to the display indicator 52 located directly below the thumb 46. This underlying indicator 52 is represented as a light grey outlined display indicator 56, as can be seen in FIGS. 5 and 13. A new position of the thumb 46 will also raise a new targeted one of the target rings from the display 18 to the top of the ring stack shown on the GUI 12, in this case ring 19.

Another feature of the display indicators 52 is that when one is selected by the Network Manager, with a cursor for example, the targeted or associated ring corresponding to the selected display indicator 52 is shown permanently on the GUI 12 until deselected by the Network Manager. Accordingly, the display on the GUI 12, of any ring attached to the central hub 16 can be toggled on and off by selecting or deselecting the corresponding indicator 52. Selecting a particular display indicator 52, to cause a permanent display of a targeted or associated ring, changes the indicators 52 shading from dark grey to light grey and unselecting the display indicator 52 changes the shading back from light to dark grey, as shown by display indicator 53 in FIG. 5. It should be noted that the indicators 52 are dark grey when the stacked display format 26a is shown on the GUI 12a (see FIG. 5), since all of the rings in the ring display 18 are displayed initially permanently by default. However, for the overlaid format 26b (see FIG. 6) only those rings with an associated light grey type 53 of indicator 52, other than the ring selected by the thumb 46, are displayed in a dark or lighter colour view on the GUI 12b. For example, any display indicator 52 can be clicked on by the Network Manager at any time to force the permanent display of the associated hub segment 21 in a lighter shade, as compared to the target segment 19 in a darker shade. The same procedure repeated a second time removes the associated hub segment 21 from the display 18. It should be noted that the target hub segment 19 stays displayed in the darker opaque shade until a new target segment is selected. For further shading details please refer to FIG. 13.

One additional feature of the indicators 52 on the bar 30 is that any rings in the display 18, which are interrelated with the target ring 19 selected by the thumb 46, are represented with a black outlined display indicator 54. This interrelationship could represent a sub network of rings from the total number of rings in the hub network 3. In the case shown in FIG. 5, both indicators 53 and 54 have the black bounding box 57. Therefore, the user can straightforwardly identify by looking at the bar 30 that the ring "11" is interrelated in function to the rings associated with indicators 53 and 54. It should be noted that this interrelationship is also indicated with respect to an indicator 56 corresponding to "Ring # 11" by a light grey bounding box 59.

Figure 8:
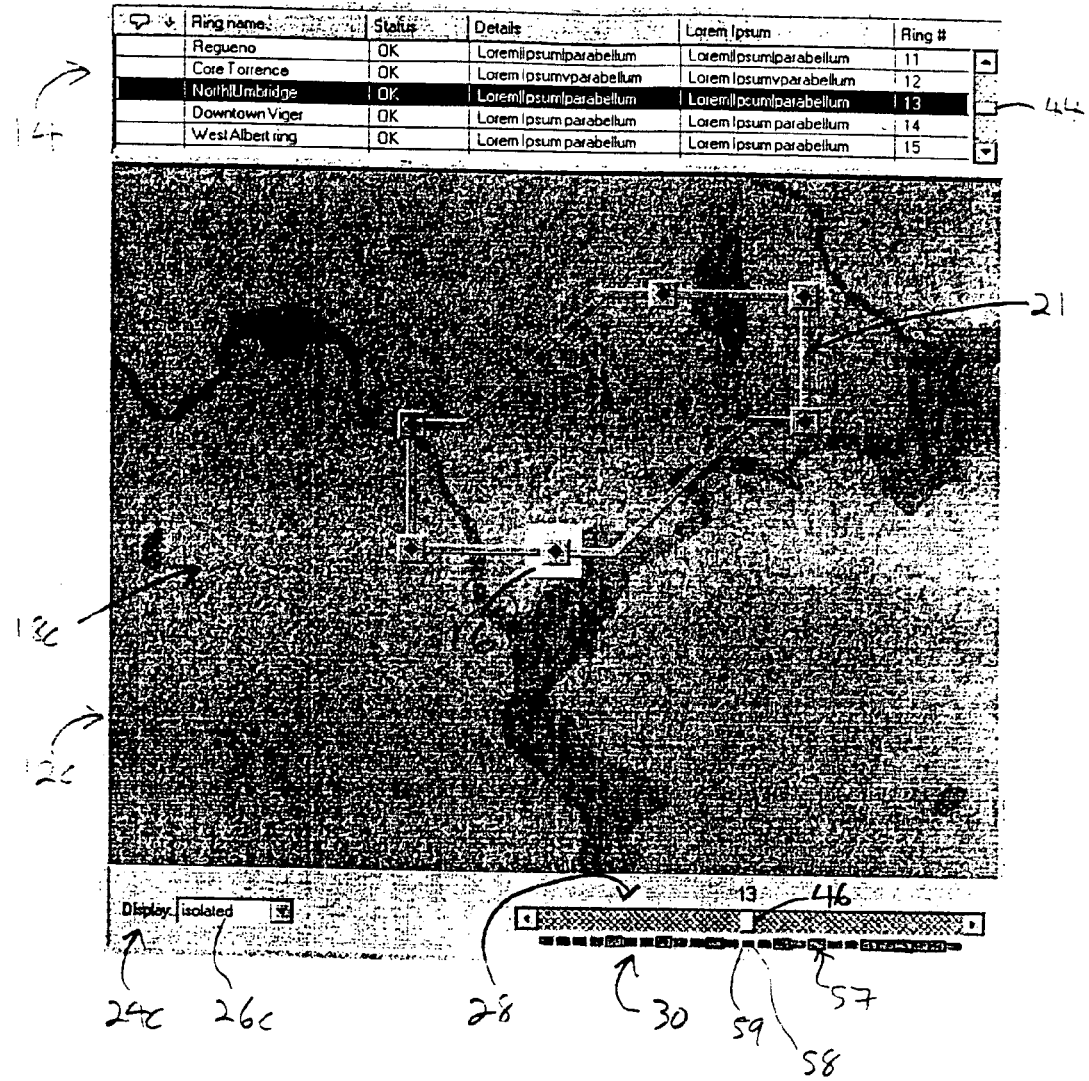
FIG. 8 is a diagram showing an isolated display type of FIG. 2.

As described above, the indicators 53 and 54 can be selected by the Network Manager to display on the GUI 12 the two associated rings in combination with ring number "11", thereby facilitating a direct comparison or surveillance of the sub network consisting of the three desired rings. An additional heading 34 of the list 14 could be directed to sorting the ring attributes according only to those directly displayed on the GUI 12, such as targeted, associated, and remaining rings. In this case, this would result in the list 14 containing a grouping of rows 41 associated with ring "11" and those rings corresponding to the indicators 53 and 54. It should be noted that the black bounding box feature is available with all three display formats 26a,b,c, as seen in FIGS. 6, 7, and 8. It is recognized that colour schemes for the indicator 52 and bounding boxes 56, 57 other than those described can be used, if desired.

Referring to FIG. 6, the stacked display format 26a presents the total of rings in the display 18a stacked on top of one another on the GUI 12a. The display 18a is presented as a virtual spiral, wherein the attached individual rings or network segments are displayed radiating in an orderly fashion from a central region of the spiral represented by the central hub 16. The background 13 can be represented by a particular geographical representation, upon which the hub network is located. When a target ring or network segment is targeted by the Network Manager from either the scroll bar 28 or the list 14, the targeted ring will be shown overlapping the associated or remaining rings in the display 18a that are not targeted, such as shown by the targeted ring 19 overlapping the associated ring 21 in FIG. 2. In this case, the targeted "Ring # 11" would be indicated by thumb 46 in the scroll bar 28. It should be noted that the top most ring 19 or target ring, of the display 18a is somewhat identifiable since the components of ring 19 overlay all other associated and remaining rings in the display 18a. The differentiation of ring 19 is further enhanced by displaying the ring 19 as a darker or shade on the GUI 12a, as compared to the other rings present in the ring display 18. However, visibility of the ring 19 selected and the associated 21 stacked rings on the GUI 12*a* can still be somewhat difficult to interpret by the Network Manager, in respect to "dense" configurations.

Referring to FIG. 7, the overlaid display format 26*b* presents the selection of target ring 19, and associated ring 21 as separated from all other remaining rings in the display 18 that are not selected, which are instead displayed as the ghosted or transparent view of remaining rings 29. This feature can help the Network Manager maintain a sense of the network 3 size and ring orientation, while analyzing only the properties of the selected rings 19, 21. It should be noted that both rings 19 and 21 overlap all ghosted view rings 29. Recall, the rings 19, 21 can be selected by using the list 14 or the scroll bar 28. Furthermore, any associated rings selected by the display indicators 52 are shown in a lighter shade, can be permanently displayed on the GUI 12, and are overlapped by the target ring that is currently selected by the thumb 46, as shown by target ring 19 and associated ring 21 in FIG. 2. It is recognized that colour and shading schemes other than those described can be used to present the user with a user-friendly operation of tool 10 elements 14, 18, 24, 28, and 30, if desired.

Referring to FIG. 8, the isolated display format 26*c* presents only a selection of the display 18 isolated from the total number of rings in the hub network. Initially, the target ring 21 is selected from either the scroll bar 28 or the list 14 as the only network segment presented on the GUI 12. However, the list 14 and the scroll bar 28 and associated indicator bar 30 contain the full list of rings or segments connected to the central hub 16, as well as the associated rings to ring 21 indicated by the black bounding boxes 57 around related ones of the indicators 52. By selecting the display indicators 52 on the indicator bar 30, outlined by the black bounding boxes 57, the associated rings would be shown in a normal lighter shade on the display 18 and overlapped by the darker shade target ring 21 that is currently selected by thumb 46. It should be noted that not all the rings in the hub network are shown, which is contrary to the stacked and overlaid display formats 26*a,b*, respectively. Only the rings identified by the thumb 46 and selected indicators 52 are shown on the GUI 12. This arrangement can provide a relatively clutter free display of selected ring configurations, as desired by the Network Manager for facilitating network analysis in critical node/ring and alarm surveillance.

Figure 9:
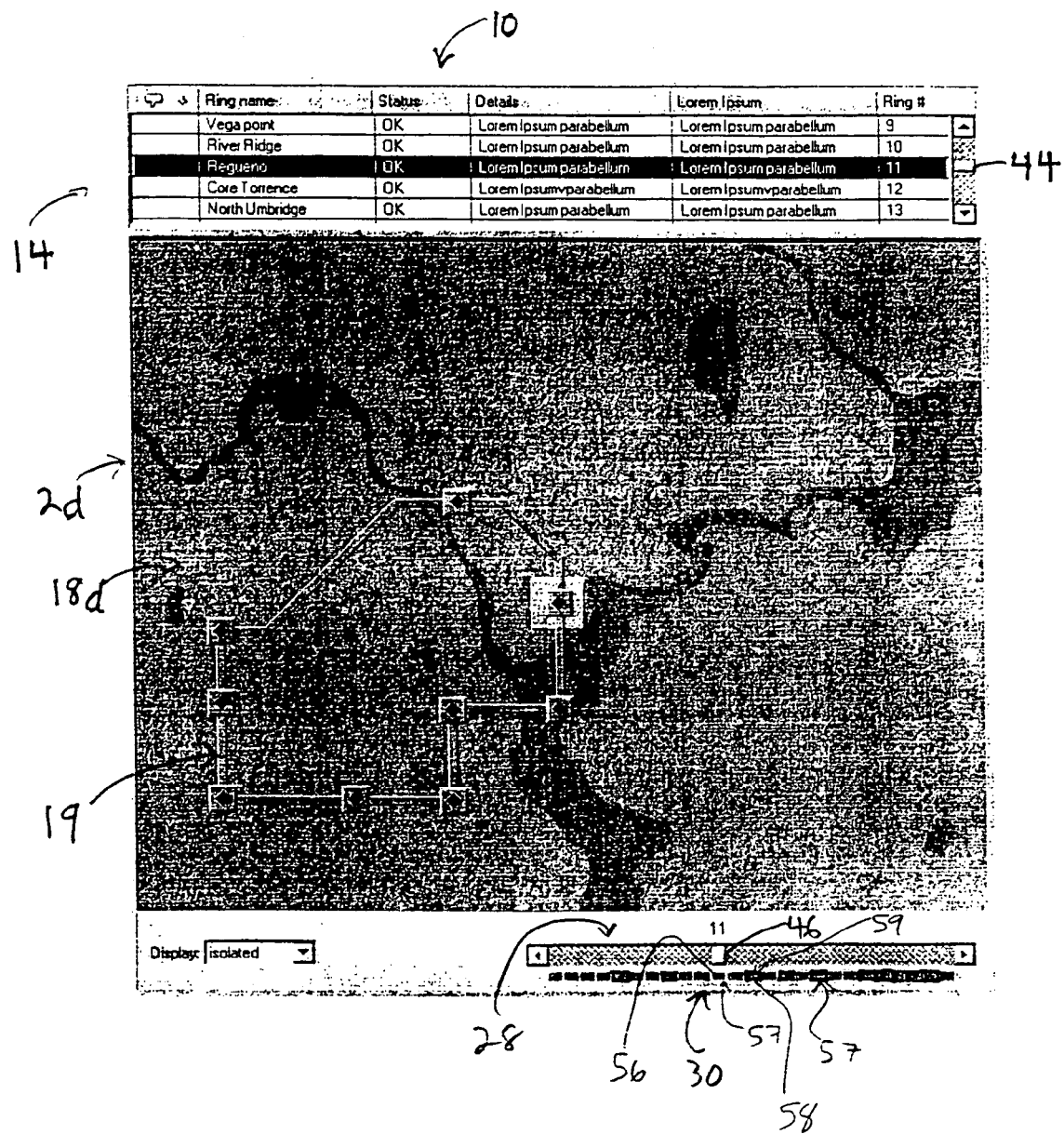
FIG. 9 is a sequential display of a GUI shown in FIG. 8.

Referring to FIG. 9, a sequential view of the display 18*c* is shown. The Network Manager changed the GUI 12*c* to GUI 12*d* by moving the thumb 46 from the "$13^{th}$" position to the "$11^{th}$" position, thereby removing target ring 21 from the display 18 and inserting target ring 19 therein. It should be noted that the light grey box 59 around the indicator 58, representing "Ring # 13" in FIG. 7, has been changed to a black box 57 in FIG. 8, and vice versa for the indicator 56 representing "Ring #11". It should also be noted that as various rings 19,21 are selected in sequence, the central hub 16 remains stationary, thereby providing a common visual reference point to the Network Manager.

Figure 10:
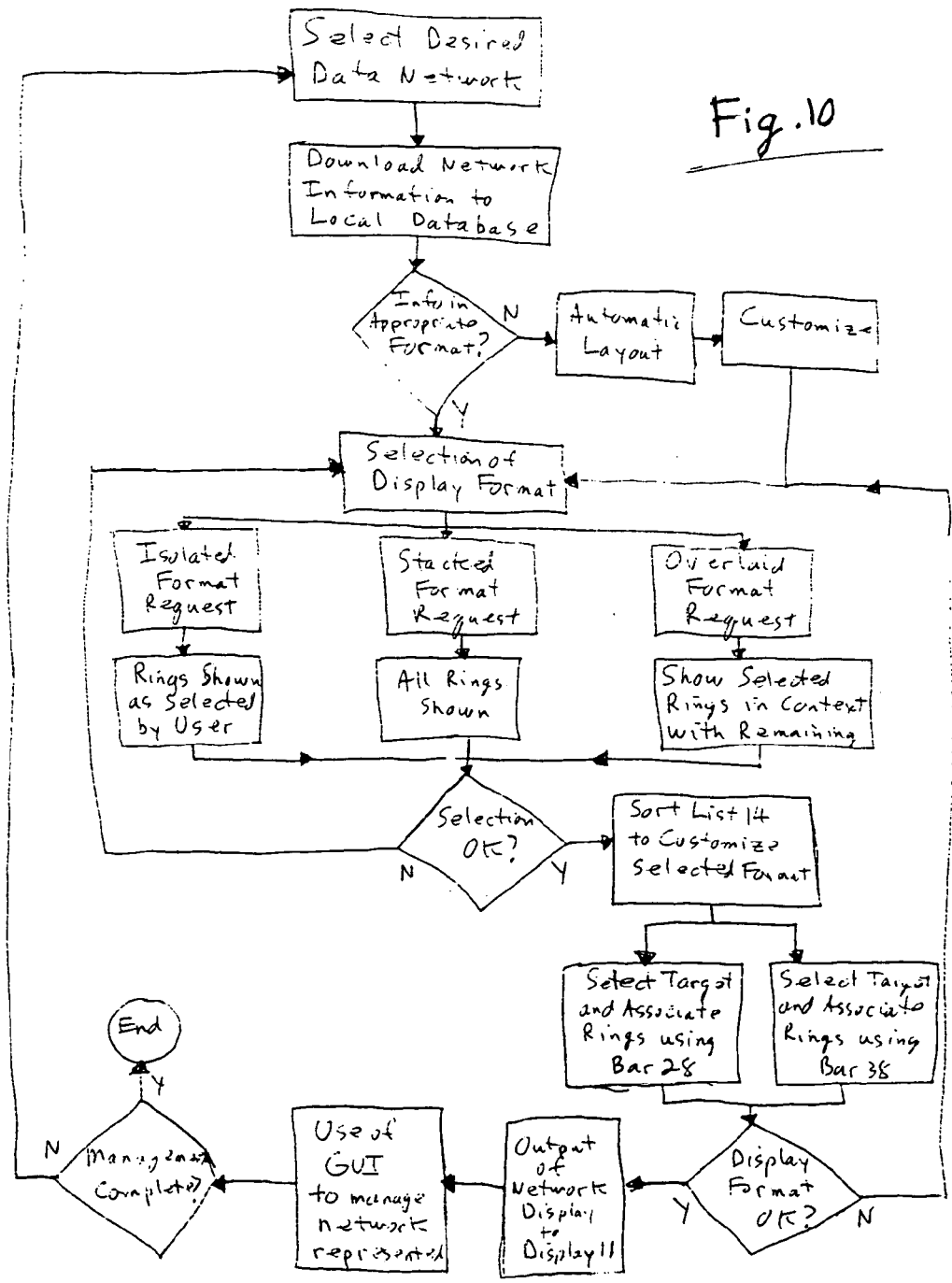
FIG. 10 is an operations flowchart of the tool of FIG. 2.

Referring to FIG. 10 for operation of the network configuration tool 10, the user can view the rings or segments contained in the display 18 that are interconnected by the central hub 16. The user chooses a particular data network 3 for view and the corresponding network information is downloaded from the global database 5 to the local database 6. The user can then use the input device 8 to manage operational features of the tool 10.

The downloaded information of the segments and corresponding nodes 20 and links 22 of the network 3 can to be formatted for representation on the display 18, which will be presented on the GUI 12 with the attribute details shown in the list 14. Prior to using the tool 10 for network management, the tool 10 can be used as an editing facility to layout the desired network rings in separate windows. As the individual distinct network rings are constructed, they are assembled into the common GUI 12 display. The user can use the tool 10 to construct the number and position of the nodes 20, the length and orientation of the links 22, and assemble ring attributes contained in the list 14 and interrelations indicated by the indicators 52. The user can also choose the background 13 to represent a specific topology, geography, predefined or custom patterns abstract representation, or a solid colour.

Layout of the hub segments in the hub network display 18 can be based on the network information for the particular data network 3 read from the global network database 5. An automatic default layout procedure could assign a relative position and orientation to the hub segments (such as rings 19, 21) and their components (such as nodes 20 and links 22) with respect to the central hub node 16. Such automatic layout could provide a fairly uniform distribution of the graphical distribution of visual elements on the display 18 in order to optimize readability and usability of the display 18 on the GUI 12. The automatic layout could also be used to optimize the distribution of the segments around the central hub nodes 16 to facilitate the construction of the endless spiral metaphor and its usage in conjunction with the reference frame and the list 14. Preferably, in the chosen hub network 3, the automatic layout process would result in the same network configuration display 18 each time the hub explorer tool 10 is used to view the display 18, provided that the typology of the selected network 3, or that of its segments, have not been externally modified in the interim. In another layout procedure option, should the user prefer to modify the automatic layout organization, the user could do so by repositioning the various network segments and associate components by employing regular network layout editing functions, such as those provided in the Nortel Networks Precide environment. In such cases, however, the tool 10 may not be able to maintain optimization of readability and/or graphical distribution of the hub network configuration. It is also recognized that once the particular layouts are defined, these definitions could be saved in the local database 6 so that they can be displayed again in future managing sessions using the tool 10.

Changing the presentation format of the GUI 12 can be done by selecting the drop down menu control button 25 from the drop down menu bar 24, and then selecting the desired display format 26. For example, when the user wishes to survey a network consisting of 30 rings, the user first selects the desired central hub 16 representing that hub network configuration and displays the display 18 using the stacked format 26*a*. The stacked display format 26*a* (see FIG. 6) presents all rings in the display 18 that are interconnected by the central hub 16. The target ring 19 (Ring #11 as identified by thumb 46) that is currently targeted is presented as overlapping all the remaining rings in the ring display 18 that are not selected. It should be noted that in this case, no rings are yet identified as associated rings on the GUI 12, therefore presenting the target ring 19 in a dark shade and all other remaining rings 29 as transparent. The user can then sort the list 14 by alarm status to determine which of the rings, as identified by the Ring #s in column 37, are in "FAIL" mode. If the individual alarm signals in the display 18 of the stacked format 26a are difficult to detect, the user can select various "FAIL" mode rings by choosing one target ring in the list by the thumb 46 or by selecting a row 41, and the associated rings in the list 14 by the corresponding indicators 52 of the bar 30, with regards to the Ring # identified in the list. This will bring the target and associated rings to the top of the stack shown on the GUI 12. It should be noted that the target ring identified by the thumb 46 is the topmost ring on the stack, and that the selected row 32 can be identified by being displayed in a reverse mode to others in the list 14, such as white text on a dark background.

If the interrelationships of the "FAIL" mode rings are still difficult to determine, the user can switch the GUI 12 to the overlaid format 26b. The overlaid display format 26b (see FIG. 7) presents on the GUI 12 the target rings 19, and associated 21 that are currently selected, which overlap the remaining rings 29 that are not selected and shown in transparent view. In this manner, the user can still see the total number of rings contained in the network, but the affected "FAIL" mode rings are the only rings that are prominently displayed. The interrelationship indicators 57,59 can be used along with the indicators 52 to provide a fixed reference frame to maintain segment location in context for the subset of "FAIL" rings to the total number of rings. The reference frame is preferably shown on the GUI 12 to provide a quick reference to the user of the tool 10 as the user navigates through the hub network configuration.

The user can also select the isolated format 26c (see FIGS. 2, 8, and 9) if a more detailed exploration on individual targeted or associated rings or if a custom ring subset is desired. The display format 26c presents only the target ring that is currently selected by the thumb 46, whereas the rings not selected are hidden from view on the GUI 12. However, any associated rings from the display 18 that the user wishes to add subsequently into the GUI 12 can be selected by choosing the display indicators 52. The list 14, the bar 30, the indicators 52, and the interrelation indicators 57, 59 can help guide the user as to which additional rings the user may want to display on the GUI 12. Therefore, the tool 10 features 14, 30, 52, and 57,59 can help the user navigate through the total number of rings contained in the network configuration, even if these rings are not shown on the GUI 12. It should be noted that the indicators could be used to display any combination of target and associated rings selected from the total ring set for display on the GUI 12. The associated rings added by selecting the display indicators 52 can be presented as overlapped and in a lighter shade than the target identified by the thumb 46. It should be noted that as the rings 19, 21 are chosen in sequence (see FIGS. 8 and 9), the rings 19, 21 revolve around the central hub 16. Accordingly, the central hub provides a fixed visual reference for all targeted, associated, and remaining rings connected thereto.

Targeting rings from the network configuration can be accomplished by using the list 14 or the scroll bar 28. If selecting the ring through the list 14, the scroll bar 38 can be used to scroll the list 14 to the desired row 41. By using the up arrow 40 or the down arrow 42, each of the distinct rings interconnected to the central hub 16 can be viewed. Note that each of the rings are assigned names, statuses, details and ring numbers, as indicated by the headings found in row 39 of the list 14. These headings 34 can also be used to sort the data contained in the various columns to facilitate the ring selection process. It should be noted that the attributes of the list 14 can be sorted, but preferably not selected, and that selections in the list 14 are mutually exclusive.

When the target ring that is desired is found, selecting or clicking on the desired row 32 will present the corresponding target ring on the GUI 12 on the top of the ring stack and the description of the ring attributes selected in the row 32 will be highlighted (i.e. shown in reverse mode). The block 46 is simultaneously positioned over the indicator 52 representing the target ring on the bar 30.

Another method for selecting the target ring is to use the scroll bar 28. One way is to select and drag the thumb 46 to the right or the left on the scroll bar 28 and on top of a desired indicator 52, thereby presenting the targeted ring 18 on the GUI 12. Another way is to use the left arrow 48 and the right arrow 50. By selecting the control arrows 48 or 50, the thumb 46 moves to the left or right according to how many times the arrows 48 or 50 are selected.

It should be noted that use of the list 14 and the scroll bar 28 and indicator bar 30 provide control to facilitate the orderly display of rings contained in the display 18 on the GUI 12. The Network Manager can affect the contents displayed on the GUI 12 by way of various tool 10 features, thereby controlling the number and density of displayed rings in the display 18. Accordingly, the Network Manager also has control over the total visual mesh, concentration, and complexity of the hub network representation shown by the list 14, GUI 12, and bars 28, 30. Therefore, the ability to selectively display and analyze the attributes of various interrelated attached ring sets (consisting of targeted, associated and remaining segments) helps the Network Manager to construct simultaneous and alternative displays 18 on the GUI 12, for use in the detection and maintenance of elaborate network interrelationships, while maintaining location in context. It is recognized that the operation of the tool 10 can be provided by computer network representation software containing the above-described system 10 features as software and/or hardware modules represented by the computer readable media 9.

A further embodiment of the tool 10, shown in FIG. 11, contains a detailed list 60, which contains more detailed information and ring attributes other than those contained in columns 34 of the list 14. The contents of list 60 correspond to a node 62 of a ring 23 shown by the GUI 12c, as selected by the thumb 46. The list 60 can contain attributes of the node 62 such as but not limited to name, type, layers, NE address, controller address, S/W version, domain, vendor, and state. As the Network Manager selects node 62 from the group of nodes 20 of the ring 23, the selected node 62 can be differentiated on the GUI 12c by an enlarged icon and the appearance of a node reference number 64. It is recognized that other node differentiation criteria could be used, such as various colours, shadings, and alternate symbols. The list 60 can provide information about the target ring or segments selected, and information about its corresponding network elements, such as nodes and links. The information displayed in this list 60 can be presented using various layouts and GUI means, such as but not limited to icons, labels, values, and lists, adapted to the type and extent the desired data.

Figure 12:
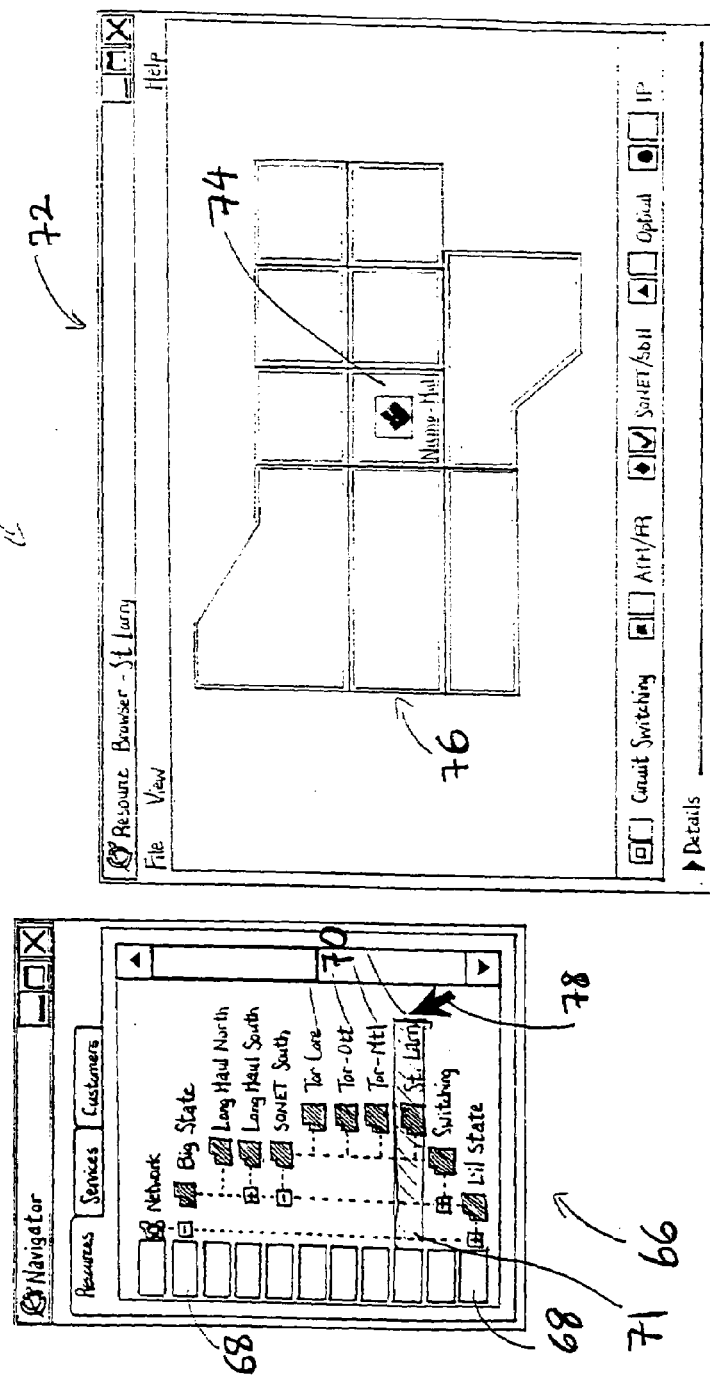
FIG. 12 is a launch display of the tool of FIG. 2.

As shown in FIG. 12, another embodiment of the tool 10 includes an application launch menu 66 for display on a computer display. The menu 66 provides a way of launching the tool 10 from a network management view used to access the tool 10 from a regular network management application, such as Nortel Networks Precide Application Platform. The menu 66 contains a series of selectable network regions 68, which can include an associated series of individual hub network configurations 70, which can be organized in the menu 66 according to user definition or structure. When the user selects one of the configurations 70, indicated as highlighted row 71 adjacent to the cursor 78, the launch menu 66 causes an intermediate view 72 or Resource Browser to appear on the computer display 11. The view 72 contains a hub node icon 74 for launching a version of the tool 10 corresponding to the particular configuration 70 selected from the menu 66. Also contained on the view 72 are attached hub members laid out as groups 76 around the hub node icon 74. The groups 76 can represent regions on a map and can contain several individual components. The groups 76 can be used to simplify the high level hub view, as typically hub network configurations contain many hub components, which may not be easily displayed without causing some level of visual confusion. It should be noted that even when representing the hub network as a series of high level groups 76, there could be a limit to the number of groups 76 that can be usefully presented in one view with the selected hub node icon 74. In such cases, a single group 76 or select number of groups 76 could be presented on the view 72.

Other options for launching the tool 10 (shown in FIG. 12) could be launching from a list of network central hub nodes or launching from a network view of a ring attached to a ring topology. Furthermore, upon selection of the hub node 74 in FIG. 12, a popup command menu could give access to the hub explorer tool 10 (shown in FIG. 2) to analyze the selected hub network configuration. In the case where the view 72 in FIG. 12 is presented as separate groups 76, these groups 76 could also be opened as separate views to proceed to regular Network Management applications outside of the hub context.

Although the invention has been described with reference to certain specific embodiments, various modifications thereof will be apparent to those skilled in the art without departing from the spirit and scope of the invention as outlined in the claims appended hereto.

What is claimed is:

1. A network management tool for representing a network configuration including a plurality of distinct network segments coupled to a centralized node, the tool comprising:
   a) a user interface for displaying the representation of said network configuration;
   b) a list containing a plurality of attributes of the network segments; and
   c) a display controller for affecting a display content of said representation on said user interface, said display controller providing a reference frame for maintaining the location of selected ones of the network segments in context of said display content;
   wherein said list and said display controller are presented on said user interface and are operable for a user to control the display of said display content in a predetermined sequence on said user interface.

2. The network management tool of claim 1 further comprising the reference frame of said display controller having a plurality of display indicators for indicating a predetermined number of selected network components of said representation.

3. The network management tool of claim 2, wherein the display indicators provide a global context of the selected network components on said user interface.

4. The network management tool of claim 3, wherein said predetermined number is the total number of said selected network components contained in said network configuration.

5. The network management tool of claim 3, wherein said selected network components are coupled to distinct said centralized node and are selected from the group comprising line, ring, star, bus, and chain.

6. The network management tool of claim 2 or 3 further comprising a reference feature of said display controller capable of identifying a selected network component of said representation.

7. The network management tool of claim 6, wherein said reference feature is a unique identifier of said selected network component.

8. The network management tool of claim 7, wherein said unique identifier is also contained in said list content of said list.

9. The network management tool of claim 8, wherein said unique identifier contained in said list is operatively coupled to said unique identifier contained in said display controller.

10. The network management tool of claim 8, wherein said selected network component is one of the distinct network segments.

11. The network management tool of claim 6 further comprising a plurality of interrelation indicators associated with said plurality of display indicators, the interrelation indicators for providing an indication of interrelated network components.

12. The network management tool of claim 11, wherein said interrelation indicators are coupled to said reference feature.

13. The network management tool of claim 12, wherein said selected network component is one of the distinct network segments.

14. The network management tool of claim 2 or 3, wherein the display indicators coordinate a number of the selected network components contained in said display content.

15. The network management tool of claim 2, wherein said display content is presented as a virtual spiral of the distinct network rings displayed in said predetermined sequence.

16. The network management tool of claim 15 further comprising the display of said virtual spiral radiating from a central region of the spiral.

17. The network management tool of claim 16, wherein said central region is said centralized node.

18. The network management tool of claim 1 or 2 further comprising a sorter for ordering said list content of the selectable attributes in a predetermined order.

19. The network management tool of claim 1 further comprising a formatter for ordering said display content according to a predetermined format.

20. The network management tool of claim 19, wherein the predetermined format is selected from the group comprising stacked, overlaid, and isolated.

21. The network management tool of claim 19 or 20 further comprising a plurality of display indicators for modifying said display content presented by the predetermined format.

22. The network management tool of claim 21, wherein said display indicators are operatively coupled to some of the selected attributes in said list.

23. The network management tool of claim 1 or 2 further comprising a supplemental list for communicating additional information to that contained in said list, said supplemental list is associated with a selected network component contained in said display content.

24. A computer program product for representing a network configuration including a plurality of distinct network segments coupled to a centralized node, the product comprising:

a) a computer-readable medium;

b) a display module stored on the computer-readable medium for displaying the representation of said network configuration;

c) a list module coupled to said display module for displaying a plurality of attributes of the network segments; and d) a display controller module coupled to said display module for affecting an output display content of said representation generated by said display module, said display controller module providing a reference frame for maintaining the location in context of selected ones of the network segments of the display content; wherein said display module presents said list and said display controller are presented on a user interface and are operable for a user to control the display of said display content in a predetermined sequence.

25. A method for representing a network configuration including a plurality of distinct network segments coupled to a centralized node, the method comprising:

a) displaying the representation of said network configuration;

b) displaying a list containing a plurality of attributes of the network segments;

c) displaying an operable display controller for controlling a display content of said representation through a reference frame for maintaining the location in context of selected ones of the network segments of said display content; and d) coordinating the display of said display content by the reference frame in a predetermined sequence.

26. The network management tool of claim 9, wherein said selected network component is one of the distinct network segments.

27. The network management tool of claim 7 further comprising a plurality of interrelation indicators associated with said plurality of display indicators, the interrelation indicators for providing an indication of interrelated network components.

28. The network management tool of claim 6, wherein said display content is presented as a virtual spiral of the distinct network rings displayed in said predetermined sequence.

* * * * *